(12) United States Patent
Sasaki

(10) Patent No.: US 7,725,767 B2
(45) Date of Patent: May 25, 2010

(54) APPARATUS INCLUDING AN OPERATING MANAGER AND A SWITCH FOR DISCONNECTING THE OPERATING MANAGER FROM A BUS

(75) Inventor: Kenichi Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 853 days.

(21) Appl. No.: 11/490,201

(22) Filed: Jul. 21, 2006

(65) Prior Publication Data
US 2007/0022229 A1    Jan. 25, 2007

(30) Foreign Application Priority Data
Jul. 25, 2005   (JP)   ............... 2005/214245

(51) Int. Cl.
*G06F 11/00* (2006.01)
(52) U.S. Cl. ...................................... 714/13
(58) Field of Classification Search .................. 714/13, 714/43
See application file for complete search history.

(56) References Cited
U.S. PATENT DOCUMENTS

| | | | | |
|---|---|---|---|---|
| 5,636,341 A | * | 6/1997 | Matsushita et al. ............ | 714/13 |
| 5,696,895 A | * | 12/1997 | Hemphill et al. ................ | 714/4 |
| 5,812,751 A | * | 9/1998 | Ekrot et al. ..................... | 714/4 |
| 5,822,512 A | * | 10/1998 | Goodrum et al. .............. | 714/13 |
| 6,434,703 B1 | * | 8/2002 | Parrish et al. ................ | 713/310 |
| 6,643,795 B1 | * | 11/2003 | Sicola et al. .................... | 714/6 |
| 6,754,762 B1 | * | 6/2004 | Curley .......................... | 710/316 |
| 7,330,999 B2 | * | 2/2008 | Davies et al. ................... | 714/9 |
| 2004/0255187 A1 | * | 12/2004 | Gabriel Vecoven ............. | 714/6 |

FOREIGN PATENT DOCUMENTS

JP      11-338724       12/1999

OTHER PUBLICATIONS

Dominique Paret, et al., "The I2C Bus from Theory to Practice", Ed. BK & DISK, Wiley, pp. 23-62.

\* cited by examiner

*Primary Examiner*—Robert Beausoliel
*Assistant Examiner*—Elmira Mehrmanesh
(74) *Attorney, Agent, or Firm*—McGinn IP Law Group, PLLC

(57) ABSTRACT

In the system which connects an operation apparatus and a standby apparatus through a bus, the operation apparatus includes a controller which controls the operation of the operation apparatus, operation manager, and the switch. The operation manager monitors the operation of the controller and notifies the standby apparatus through the bus that the controller operates normally. The switch disconnects the operation manager from the bus except when the operation manager notifies the second apparatus that said controller is operating normally through the bus.

33 Claims, 6 Drawing Sheets

APPARATUS INCLUDING AN OPERATING MANAGER AND A SWITCH FOR DISCONNECTING THE OPERATING MANAGER FROM A BUS

BACKGROUND OF THE INVENTION

The present invention relates to an operation apparatus, a standby apparatus, operation and standby systems, and operation and standby control methods and more particularly to an operation apparatus, a standby apparatus, operation and standby systems, and operation and standby control methods that can avoid an error caused by noise during failure management.

In conventional operation and standby systems disclosed in Japanese Patent Application Laid-open Hei No. 11-338,724, the operation system and the standby system send heartbeat signals to each other in order to confirm the operation status of the other system. When the standby system does not receive a heartbeat signal from the operation system after a certain period of time, it is determined that the operation system must have a failure.

In the conventional operation and standby-systems, the operation and standby systems have a problem. The problem is that there is no countermeasure for noise. For example, when a failed operation system is replaced by a hot-swap, noise is generated in the signal transmission path between the operation system and the standby system. The standby system will have an error due to this generated noise because these operation and standby systems do not have a countermeasure for noise.

The specification of I2C bus is described in "The I2C Bus from Theory to Practice, Ed. BK&DISK, written by Dominique Paret and Carl Fenger, published by WILEY".

SUMMARY OF THE INVENTION

An object of this invention is to avoid an error, in an operation apparatus, a standby apparatus, operation and standby systems, and operation and standby control methods, caused by noise.

According to one aspect of the present invention, a first apparatus which is connected to a second apparatus through a bus, is provided which includes: a controller which controls an operation of the first apparatus; an operation manager which monitors an operation of the controller; and a switch which disconnects the operation manager from the bus except when the operation manager notifies the second apparatus that the controller is operating normally through the bus.

According to another aspect of the present invention, a second apparatus which is connected to a first apparatus through a bus, is provided which includes: a controller which controls an operation of the second apparatus; an operation manager which monitors an operation of the first apparatus; and a switch which disconnects the operation manager from the bus except when the operation manager resets the first apparatus through the bus.

According to another aspect of the present invention, a system is provided which includes: a first apparatus; a second apparatus; and a bus which connects the first apparatus and the second apparatus, wherein the first apparatus comprises: a first controller which controls an operation of the first apparatus; a first operation manager which monitors an operation of the first controller; and a first switch which disconnects the first operation manager from the bus except when the first operation manager notifies the second apparatus that the first controller is operating normally through the bus; and wherein the second apparatus comprises: a second controller which controls an operation of the second apparatus; a second operation manager which monitors an operation of the first apparatus; and a second switch which disconnects the second operation manager from the bus except when the second operation manager resets the first apparatus through the bus.

According to another aspect of the present invention, a method for controlling a first apparatus which is connected to a second apparatus through a bus, is provided which includes: monitoring, by an operation manager, an operation of a controller which controls an operation of the first apparatus; disconnecting the operation manager from the bus except when the operation manager notifies the second apparatus that the controller is operating normally.

According to another aspect of the present invention, a method for controlling a second apparatus which is connected to a first apparatus through a bus, is provided which includes: monitoring, by an operation manager, an operation of the first apparatus; sending a first command for resetting the first apparatus from the operation manager when the first apparatus is not operating normally; disconnecting the operation manager from the bus except when the operation manager sends the first command.

According to another aspect of the present invention, a method for controlling a system having a first apparatus, a second apparatus, and a bus which connects the first apparatus and the second apparatus, is provided which includes: monitoring, by an first operation manager, an operation of first controller which controls an operation of the first apparatus; disconnecting the first operation manager from the bus except when the first operation manager notifies the second apparatus that the first controller is operating normally; monitoring, by an second operation manager, an operation of the first apparatus; sending a first command for resetting the first apparatus from the second operation manager when the first apparatus is not operating normally; disconnecting a second operation manager from the bus except when the second operation manager sends the first command.

BRIEF DESCRIPTION OF THE DRAWINGS

Other features and advantages of the invention will be made more apparent by the following detailed description and the accompanying drawings, wherein.

In the drawings, the same reference numerals present the same structural elements.

DETAILED DESCRIPTION OF THE PREFERRED EMBODIMENTS

A first embodiment of the present invention will be described in detail below.

Figure 1:
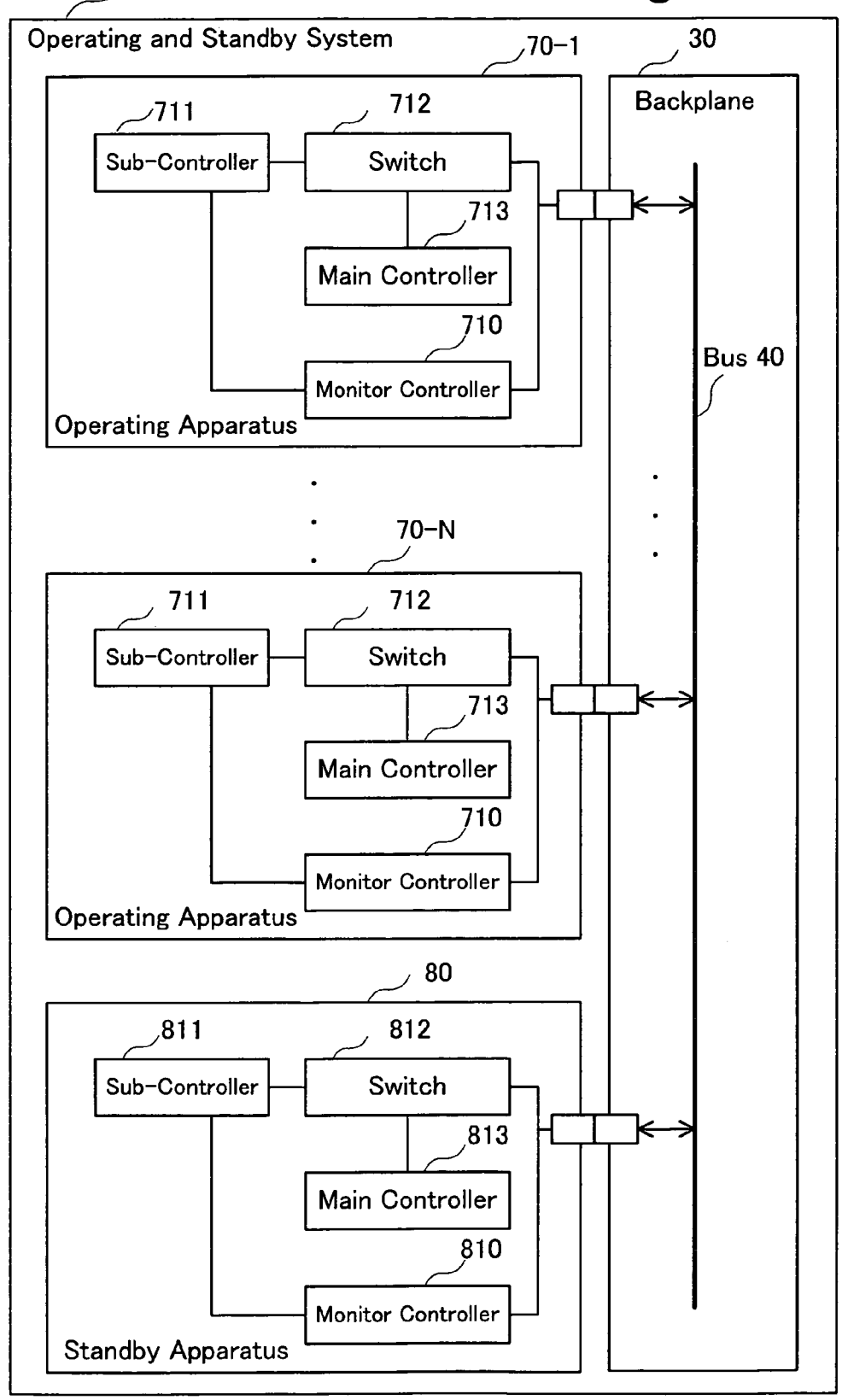
FIG. 1 is a block diagram illustrating the configuration according to a first embodiment of the present invention.

Referring to FIG. 1, an operation and standby system 100 includes operation apparatuses 70-1,70-2, . . . ,70-N, a standby apparatus 80, and a bus 40 that connects these apparatuses. For example, the operation apparatuses 70-1, 70-2, . . . , 70-N, and the standby apparatus 80 can be implemented using a blade server. The bus 40 can be implemented on a backplane 30 of the operation apparatuses 70-1, 70-2, . . . , 70-N, and the standby apparatus 80.

Each of the operation apparatuses 70-1,70-2, . . . ,70-N includes a main controller 713, a monitor controller 710, and a sub-controller 711. Each of the operation apparatuses 70-1, 70-2, . . . ,70-N also includes a switch 712. The switch 712 switches the connection of the sub-controller 711 and main controller 713 to the connection of the sub-controller 711 and the bus 40, and vice versa. Usually, the sub-controller 711 makes the switch 712 connect the sub-controller 711 and the main controller 713. When an error is not detected on the main controller 713, the sub-controller 711 makes the sub-controller 711 connect to the bus 40 at certain intervals. And, the sub-controller 711 sends a command, which orders to reverse the heartbeat signal to the standby apparatus 80 through the bus 40. In other words, the command orders to toggle the heartbeat signal. The period of the connection the sub-controller 711 and the bus 40 is extremely short. For example, the period substantially equals to a bus clock cycle. More preferably, the period substantially equals to a couple of clock cycles of a processor which is installed in the main controller 713. The monitor controller 710 receives a command which orders to assert a reset signal from the standby apparatus 80 through the bus 40. After receiving the command which orders to assert the reset signal, the monitor controller 710 asserts the reset signal in order to reset the sub-controller 711 and the main controller 713.

The standby apparatus 80 includes a main controller 813, a monitor controller 810, and a sub-controller 811. The standby apparatus 80 also includes a switch 812. The switch 812 switches the connection of the sub-controller 811 and main controller 813 to the sub-controller 811 and bus 40, and vice versa. The monitor controller 810 receives a command which orders to toggle the heartbeat signal from the operation apparatuses 70-1,70-2, . . . ,70-N through the bus 40. And, the monitor controller 810 outputs the toggled heartbeat signal to the sub-controller 811. If the toggled heartbeat signal is not detected at certain intervals, the sub-controller 811 recognizes an error with some of the operation apparatuses 70-1, 70-2, . . . ,70-N and makes the switch 812 connect the sub-controller 811 and the bus 40. Then, the sub-controller 811 sends a command which orders to assert the reset signal to some of the operation apparatuses 70-1,70-2, . . . ,70-N that were recognized as having an error through the bus 40. The standby apparatus 80 begins to operate as new operation apparatus instead of some of the operation apparatuses 70-1, 70-2, . . . ,70-N that is identified as having an error.

Next, a detailed description of a first embodiment for the present invention will be explained using FIG. 2.

Figure 2:
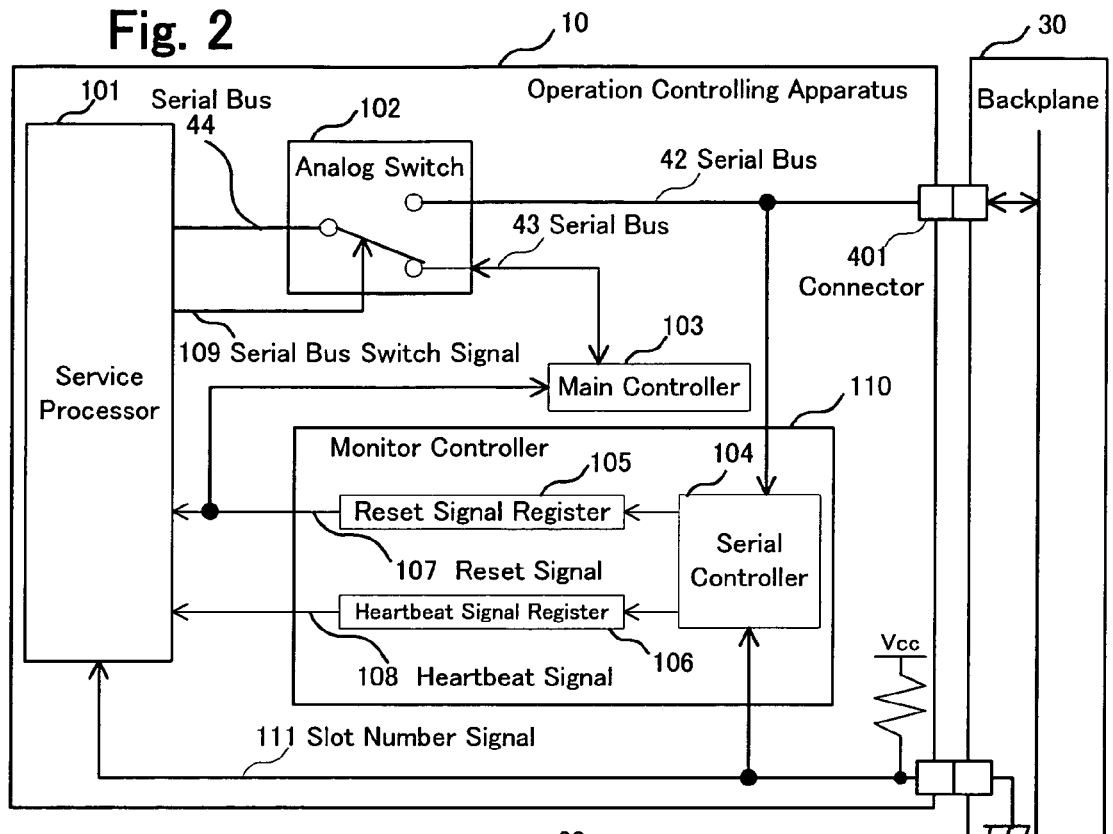
FIG. 2 is a block diagram illustrating the detailed configuration according to the first embodiment of the present invention.
Figure 2:
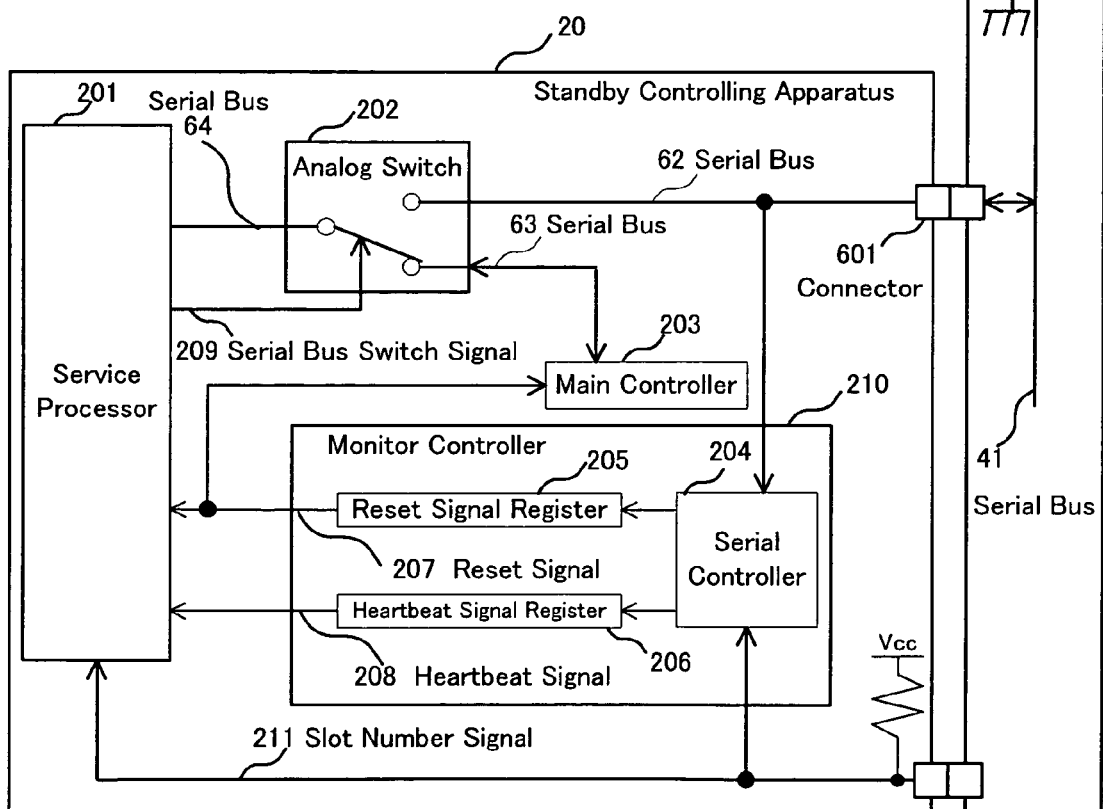

Referring to FIG. 2, the operation and standby system 100 includes an operation controlling apparatus 10 (an example of operation apparatuses 70-1,70-2, . . . ,70-N), a standby controlling apparatus 20 (an example of standby apparatus 80), and a backplane 30. In order to simplify this explanation, a preferred embodiment will be explained regarding the operation controlling apparatus 10 and the standby controlling apparatus 20 as having the same hardware configuration.

The operation controlling apparatus 10 includes a service processor 101 (an example of sub-controller 711), an analog switch 102 (an example of switch 712), a main controller 103, and a monitor controller 110. Although an analog switch is used here, it does not need to be analog. The backplane 30 includes a serial bus 41 (an example of bus 40). Although a serial bus is used here, it does not need to be serial. The monitor controller 110 includes a serial controller 104, a reset signal register 105, and a heartbeat signal register 106. Although a register is used here, an equivalent device can also be used.

In the operation controlling apparatus 10, the service processor 101 and the analog switch 102 are connected by a serial bus 44. The analog switch 102 and the main controller 103 are connected by a serial bus 43 on the operation controlling apparatus 10. The analog switch 102 and the serial controller 104 are connected by a serial bus 42 on the operation controlling apparatus 10. The serial bus 41 on the backplane 30 and the serial bus 42 on the operation controlling apparatus 10 are connected by a connector 401. When the power of the operation controlling apparatus 10 is ON, the analog switch 102 connects the service processor 101 and the main controller 103.

The standby controlling apparatus 20 includes a service processor 201 (an example of the sub-controller 811), an analog switch 202 (an example of the switch 812), a main controller 203, and a monitor controller 210. The monitor controller 210 includes a serial controller 204, a reset signal register 205, and a heartbeat signal register 206.

The service processor 201 and the analog switch 202 are connected by a serial bus 64 on the standby controlling apparatus 20. The analog switch 202 and the main controller 203 are connected by a serial bus 63 on the standby controlling apparatus 20. The analog switch 202 and the serial controller 204 are connected by a serial bus 62 on the standby controlling apparatus 20. The serial bus 41 on the backplane 30 and the serial bus 62 on the standby controlling apparatus 20 are connected by a connector 601. When the power of the standby controlling apparatus 20 is ON, the analog switch 202 connects the service processor 201 and the main controller 203.

General-purpose interfaces such as I2C can be applied to the serial buses 41,42,43,44,62,63, and 64.

The main controllers 103 and 203 can be applied, but is not limited, to operating systems and computers that operate application programs. The reset signal register 105 and the heartbeat signal register 106 can be applied, but is not limited, to SR Flip-Flop. The monitor controllers 110 and 210 can be implemented, but is not limited, to programmable devices such as PLDs.

Next, the function of each element in the operation controlling apparatus 10 will be explained.

The analog switch 102 can be switched by a serial bus switch signal 109 which is controlled by the service processor 101. The service processor 101 controls the main controller 103 through the serial bus 43 and the serial bus 44. The serial controller 104 receives the command which is sent by the service processor 201 through the serial bus 64, the serial bus 62 and the serial bus 41.

When the serial controller 104 receives the command which orders to toggle the heartbeat signal 108, the serial controller 104 reverses the heartbeat signal 108 which is held by the heartbeat signal register 106. In other words, the serial controller 104 changes the heartbeat signal 108. The service processor 101 receives the heartbeat signal 108 from the heartbeat signal register 106. Based on the heartbeat signal 108, the service processor 101 then determines whether the service processor 201 can operate or not.

When the service processor 101 does not detect the change in the heartbeat signal 108 at certain intervals, it recognizes that the service processor 201 can not operate.

When the serial controller 104 receives a command to assert the reset signal 107, the serial controller 104 asserts the reset signal 107 and stores it in the reset signal register 105. The service processor 101 and the main controller 103 receive the reset signal 107 from the reset signal register 105. When the service processor 101 and the main controller 103 receive the reset signal, the service processor 101 and the main controller 103 are reset. The service processor 101 and the serial controller 104 receive the slot number signal 111. The slot number signal 111 is used as the device number for identifying the operation controlling apparatus 10. In FIG. 2, the device number of the operation controlling apparatus 10 is low ("0").

Each element of the standby controlling apparatus 20 has the same function as each compatible element of the operation controlling apparatus 10. The service processor 201 and the serial controller 204 receive the slot number signal 211. The slot number signal 211 is used as the device number for identifying the standby controlling apparatus 20. In FIG. 2, the device number of the standby controlling apparatus 20 is high ("1").

Next, the operation of first embodiment for the present invention will be explained.

Figure 3:
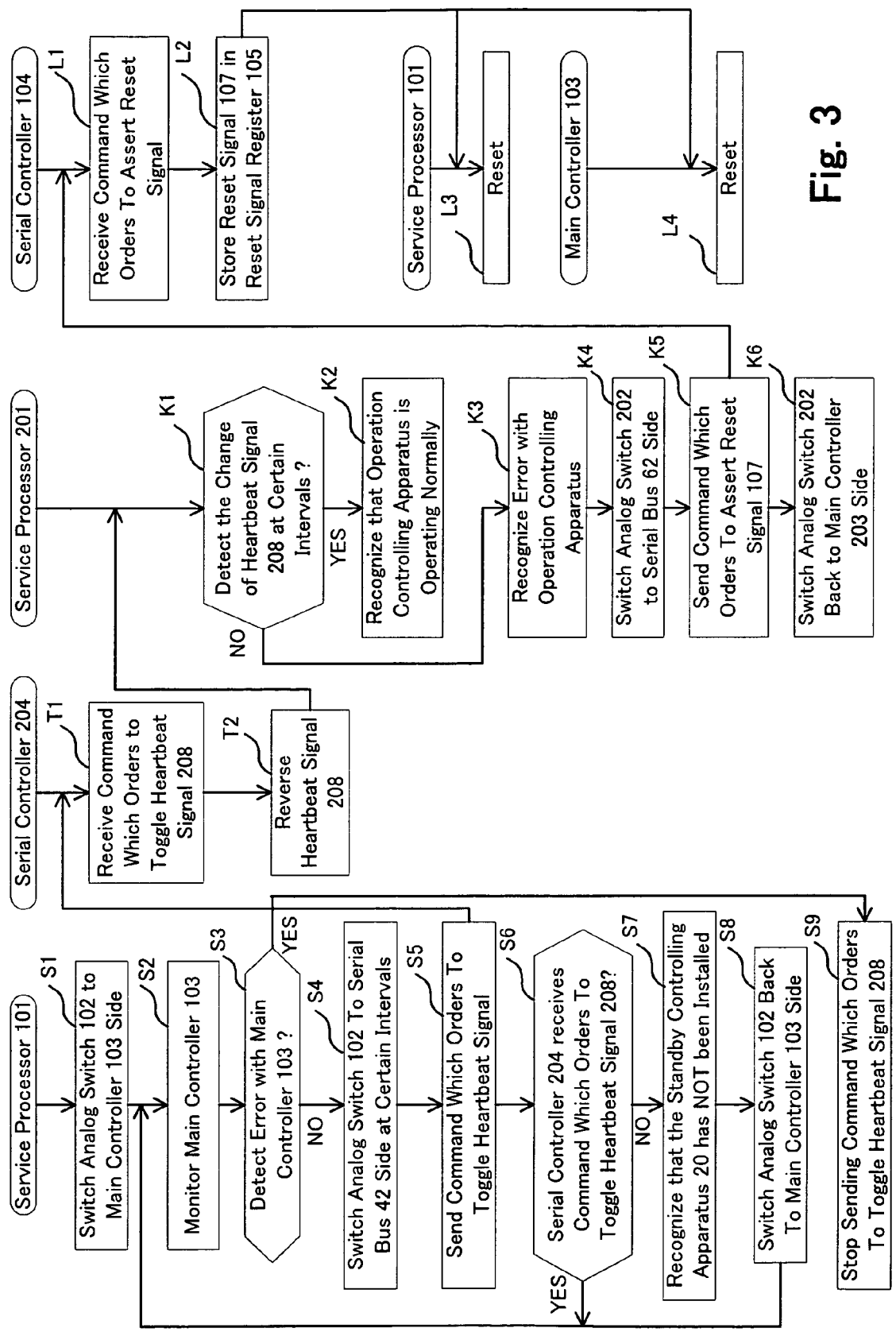
FIG. 3 is a flow chart showing the operation according to the first embodiment of the present invention.

Referring to FIG. 3, the service processor 101 switches the analog switch 102 to the main controller 103 side (S1). In other words, the analog switch 102 connects the main controller 103 and the service processor 101, usually. The service processor 101 monitors the main controller 103 through the serial bus 43 and the serial bus 44 (S2). When no error (The error such as a problem that disturbs continuous operation of the main controller 103) is detected with the main controller 103 (S3/NO), the service processor 101 switches the analog switch 102 to the serial bus 42 side using the serial bus switch signal 109 at a certain interval (such as every 1 second) (S4). In other words, the analog switch 102 connects the service processor 101 and the serial bus 41 at certain interval. Next, the service processor 101 sends a command which orders to toggle the heartbeat signal 208 to the serial controller 204 of the standby controlling apparatus 20 through serial buses (41,42,44, and 62) (S5). If the service processor 101 does not detect that the serial controller 204 has received the command which orders to toggle the heartbeat signal (S6/NO), the service processor 101 recognizes that the standby controlling apparatus 20 has not been installed (S7). For example, The serial controller 104 can judge based on the specification of I2C whether the command is received or not. If the service processor 101 detects that the serial controller 204 has received the command which orders to toggle the heartbeat signal (S6/YES), the service processor 101 recognizes that the standby controlling apparatus 20 has been installed. And, the service processor 101 switches back the analog switch 102 to the main controller 103 side, and then monitors the main controller 103 (back to S2). Also, it is possible to omit the step S6. If the step S6 is omitted, the service processor 101 switches back the analog switch 102 to the main controller 103 side as soon as the service processor 101 sends the command. More preferably, a buffer memory which stores the command ordering to toggle the heartbeat signal may be installed between the service processor 101 and the analog switch 102. For example, the buffer memory is a FIFO buffer. When the service processor 101 detects the error with the main controller 103, the service processor 101 stores the command in the buffer memory. When the service processor 101 switches the analog switch 102 to the serial bus 42 side, the command is sent to the serial controller 204 from the buffer memory. As soon as the command is sent to the serial controller 204, the analog switch 102 is switched back to the main controller 103 side. Because the command is stored in the buffer memory in advance, the service processor 101 needs not send the command to the serial controller 204. So, the period of the connection of the service processor 101 and the bus 42 is shortened.

Next, the service processor 101 switches back the analog switch 102 to the main controller 103 side using the serial bus switch signal 109 (S8). In other words, the analog switch 102 connects the service processor 101 and the main controller 103.

The service processor 101 switches the analog switch 102 to the serial bus 41 side only when it is necessary. Therefore, the service processor 101 and main controller 103 are usually physically separated from the serial bus 41. As a result, the noise that is generated on the serial bus 41 of the backplane 30 when the standby controlling apparatus 20 is replaced by hot-swap is not transferred to the service processor 101 or the main controller 103. The serial controller 104 is not physically separated from the serial bus 41. However, the noise on the serial bus 41 is not recognized as a command by the serial controller 104. The reason for this is that the noise does not meet the specification of I2C.

The serial controller 204 of the standby controlling apparatus 20 receives the command which orders to toggle the heartbeat signal 208 from the service processor 101 (T1). Then, depending on the command, the serial controller 204 reverses the heartbeat signal 208 held by the heartbeat signal register 206 (T2). When the service processor 201 detects the change of the heartbeat signal 208 at certain intervals (K1/YES), the service processor 201 recognizes that the operation controlling apparatus 10 is operating normally (K2).

When the service processor 101 of the operation controlling apparatus 10 detects an error with the main controller 103 (the error is such as a problem that disturbs continuous operation of operation controlling apparatus) (S3/YES), the service processor 101 stops sending the command ordering to toggle the heartbeat signal (S9). If the command is not sent from the service processor 101, the serial controller 204 of the standby controlling apparatus 20 does not receive the command, so the serial controller 204 does not reverse the heartbeat signal 208. The service processor 201 does not detect the change of the heartbeat signal 208 at certain interval (K1/NO), so the service processor 201 recognizes an error with the operation controlling apparatus 10 (K3).

When the operation controlling apparatus 10 can not operate continuously, it is possible that this may negatively affect the system, so it is necessary to prevent any influences on the system. In order to reset the operation controlling apparatus 10 which has an error, the service processor 201 of the standby controlling apparatus 20 switches the analog switch 202 to the serial bus 62 by using the serial bus switch signal 209 (K4). The analog switch 202 usually connects the service processor 201 and the main controller 203.

Next, the service processor 201 sends a command which orders to assert the reset signal 107 to the serial controller 104 of the operation controlling apparatus 10 through serial buses 64, 62, 41, and 42 (K5). When the service processor 201 finishes sending the command, the service processor 201 switches the analog switch 202 to the main controller 203 side using the serial bus switch signal 209 (K6). In other words, the analog switch 202 connects the service processor 201 and the main controller 203. More preferably, a buffer memory which stores the command ordering to assert the reset signal is installed between the service processor 201 and the analog switch 202. For example, the buffer memory is a FIFO buffer. When the service processor 201 does not detect the change of the heartbeat signal 208, the service processor 201 stores the command in the buffer memory. When the service processor 201 switches the analog switch 202 to the serial bus 62 side, the command is sent to to the serial controller 104 from the buffer memory. As soon as the command is sent to the serial controller 104, the analog switch 202 is switched back to the main controller 203 side. Because the command is stored in the buffer memory in advance, the service processor 201 needs not send the command to the serial controller 104. So, the period of the connection of the service processor 201 and the bus 62 is shortened.

The serial controller 104 of the operation controlling apparatus 10 receives the command which orders to assert the reset signal from the service processor 201 (L1). The serial controller 104 stores the reset signal 107 in the reset signal register 105 when the serial controller 104 receives the command (L2). As a result, the reset signal 107 is asserted.

After the assertion of the reset signal 107, the service processor 101 and the main controller 103 are reset (L3 and L4).

After resetting the service processor 101 and the main controller 103, the standby controlling apparatus 20 starts to operate as the operation controlling apparatus.

When the operation controlling apparatus 10 which has an error (already has been reset) is replaced by hot-swap with a new one, the standby controlling apparatus 20 already has been operating as the operation controlling apparatus, so the new one needs to start operating as the standby controlling apparatus.

In the following explanation of FIG. 4, the operation controlling apparatus 10 is the standby controlling apparatus 20 which started to operate as the operation controlling apparatus. And, the standby controlling apparatus 20 is the replaced one by hot-swap.

Figure 4:
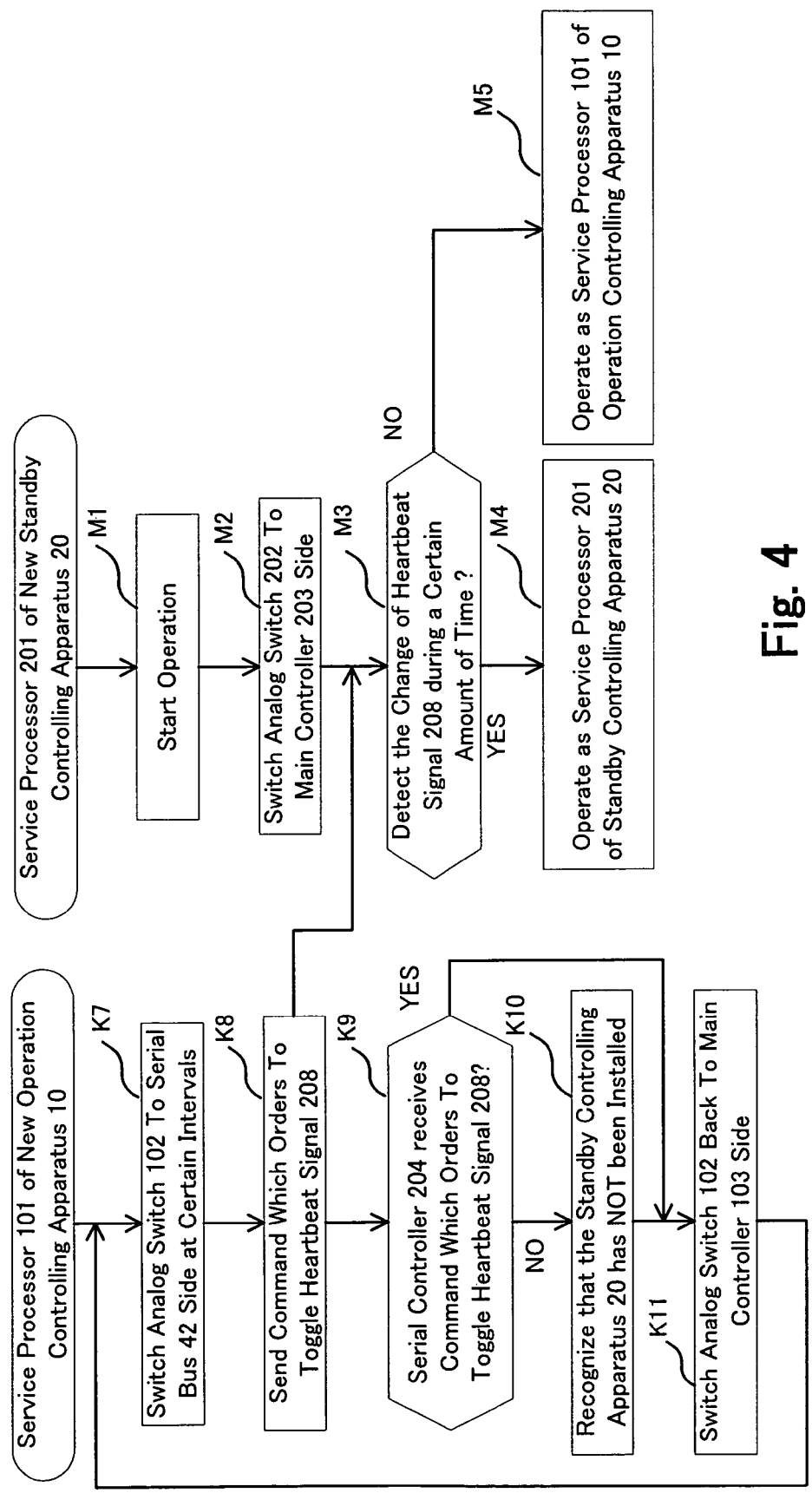
FIG. 4 is also a flow chart showing the operation according to the first embodiment of the present invention.

Referring to FIG. 4, the service processor 101 of the operation controlling apparatus 10 switches the analog switch 102 to the serial bus 41 side (K7). In other words, the analog switch 102 connects the service processor 101 and the serial bus 41. Then, the service processor 101 sends the command which orders to toggle the heartbeat signal 208 to the serial controller 204 of the standby controller 20 through serial buses (44, 42, 41, and 62) (K8).

If the service processor 101 does not detect that the serial controller 204 has received the command (K9/NO), the service processor 101 recognizes that the standby controlling apparatus 20 has not been installed (K10). For example, the serial controller 104 can judge based on the specification of I2C whether the command is received or not. Next, the service processor 101 switches the analog switch 102 to the main controller 103 side using the serial bus switch signal 109 (K11). In other words, the analog switch 102 connects the service processor 101 and the main controller 103.

The service processor 101 repeats the above operation (K7 to K11) at a certain interval (such as every 1 second).

When the standby controlling apparatus 20 is installed, the service processor 201 of the standby controlling apparatus 20 begins to operate (M1). The service processor 201 switches the analog switch 202 to the main controller 203 side (M2). In other words, the analog switch 202 connects the service processor 202 and the main controller 203. The reset signal register 205 already has been reset when the power of standby controlling apparatus 20 turns ON. Also, the reset signal 207 is de-asserted.

When the service processor 201 detects the change of the heartbeat signal 208 during a certain amount of time after startup of the service processor 201 (M3/YES), the service processor 201 recognizes that the operation controlling apparatus 10 already has been operating. The certain amount of time should be longer than one second, which is the heartbeat switch interval, such as 20 seconds. In followings, "certain amount of time" is called "initial heartbeat monitoring time". In this situation, the service processor 201 operates as the service processor 201 of the standby controlling apparatus 20 (M4). When the service processor 201 does not detect any change of the heartbeat signal 208 within the initial heartbeat monitoring time (M3/NO), the service processor 201 operates as the service processor 101 of the operation controlling apparatus 10(M5).

The following will explain how it is determined whether each controller should operate as the operation controlling apparatus 10 or as the standby operation controlling apparatus 20 when the system is turned ON simultaneously.

As shown in FIG. 2, the slot number signal 111 of the operation controlling apparatus 10 is low ("0") and the slot number signal 211 of the standby controlling apparatus 20 is high ("1"). During startup of the operation controlling apparatus 10, the service processor 101 receives the slot number signal 111. During startup of the standby controlling apparatus 20, the service processor 201 receives the slot number signal 211. For example, when the service processor 101 or 201 receive the low signal ("0"), the service processor 101 or 201 set the initial heartbeat monitoring time to 10 seconds, and when the service processor 101 or 201 receive the high signal ("1"), the service processor 101 or 201 set the initial heartbeat monitoring time to 20 seconds. The slot number signal 111 or 211 is used for determining the initial heartbeat monitoring time. The initial heartbeat monitoring time is used for determining whether each apparatus begins to operate as the operation controlling apparatus 10 or as the standby controlling apparatus 20.

If both apparatus can operate, the apparatus that has the shorter initial heartbeat monitoring time will begin to operate and send the command which orders to toggle the heartbeat signal. The other apparatus with the longer initial heartbeat monitoring time will detect the change of the heartbeat signal during the initial heartbeat monitoring time and begin to operate as the standby controlling apparatus 20.

In the first embodiment of the present invention, the reset signal is asserted through serial buses 41 without using an exclusive signal line. The reset signal asserted based on the command which orders to assert the reset signal. And, the serial controller 104, 204 judge based on the protocol of the serial bus 41. If the command is affected by the noise of the serial bus 41, the serial controller 104,204 judges that the command is not correct. Because the command affected by the noise does not meet the protocol of the serial bus 41. So, the serial controller 104, 204 does not assert the reset signal. Therefore, the protocol function will work and the noise prevention such as noise filters are not needed, which can reduce costs.

Also, in the first embodiment of the present invention, the heartbeat control and reset control are executed through the serial bus 41 on the backplane 30. Therefore, the number of signal lines that go through the connector can be reduced. In addition, when the operation controlling apparatus 10 which is reset is exchanged, the reset status will be released, so the steps for releasing the reset status can be skipped.

Next, a second embodiment of the present invention will be described in detail.

Figure 5:
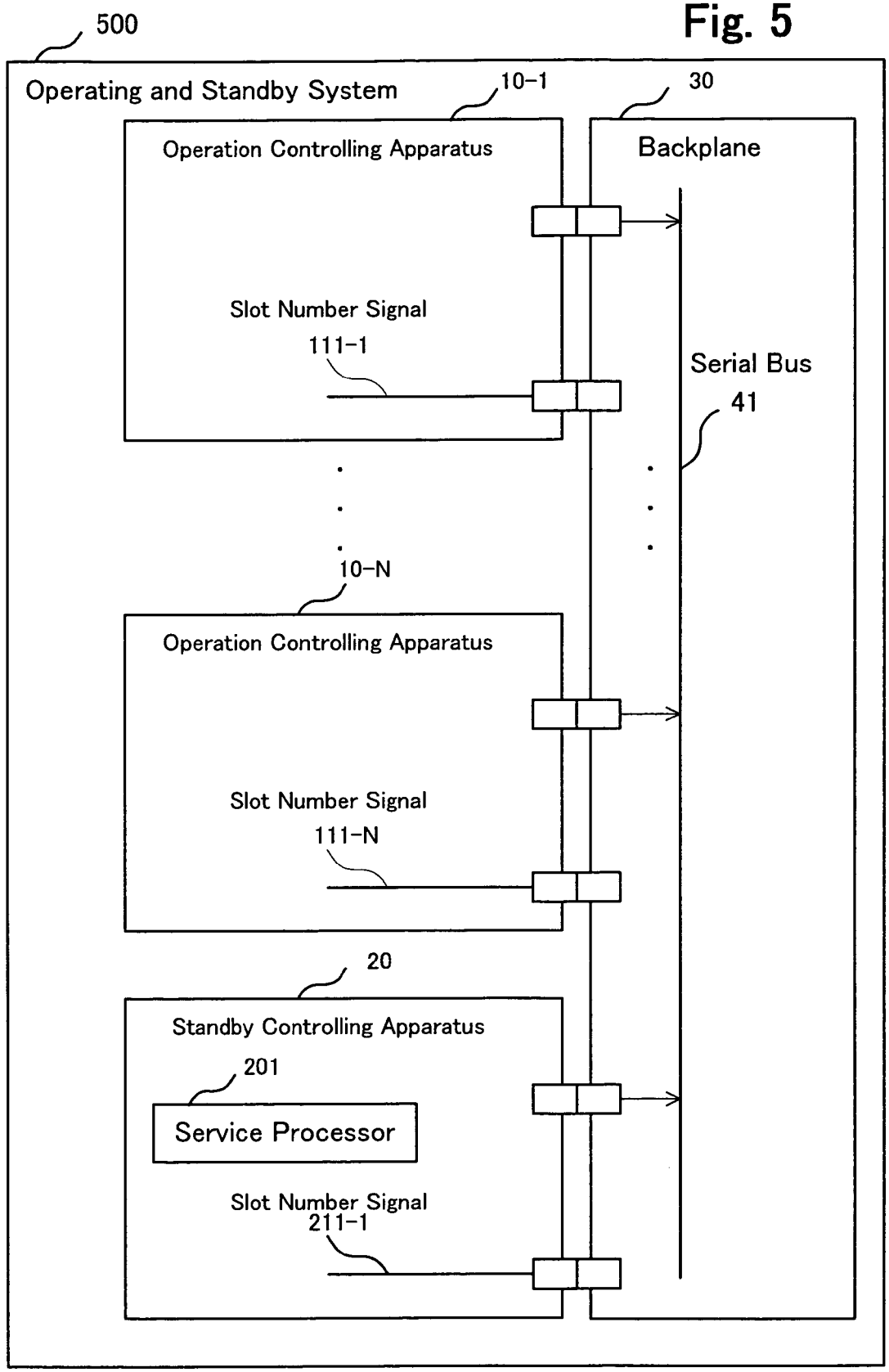
FIG. 5 is a block diagram illustrating the configuration according to a second embodiment of the present invention.

Referring to FIG. 5, the operation and standby system 500 includes operation controlling apparatuses 10-1, 10-2, . . . ,10-N and a standby controlling apparatus 20.

Operation controlling apparatuses 10-1,10-2, . . . ,10-N have different slot number signals 111-1,111-2, . . . ,111-N. The standby controlling apparatus 20 has a maximum slot number signal 211. And, the standby controlling apparatus 20 has a maximum initial heartbeat monitoring time. For example, the standby controlling apparatus 20 also detects the change of the heartbeat signal from the operation controlling apparatus 10-1 during the maximum initial heartbeat monitoring time, and it operates as the standby controlling apparatus. The operation controlling apparatuses 10-1, 10-2, . . . ,10-N send the command with the value of the slot number signal 111-1,111-2, . . . ,111-N to the standby controlling apparatus 20. According to the value of the slot number signal from the operation controlling apparatuses 10-1, 10-2, . . . ,10-N, the standby controlling apparatus 20 can recognize the source of the command. Also, the operation controlling apparatuses 10-1,10-2, . . . ,10-N and the service processor 201 of the standby controlling apparatus 20 arbitrate the competition on the serial bus 41. They arbitrate the competition based on such as specification of I2C.

It is possible in the second embodiment of the present invention to be compatible with cases where there are multiple operation controlling apparatuses.

Next, a third embodiment of the present invention will be described in detail.

Figure 6:
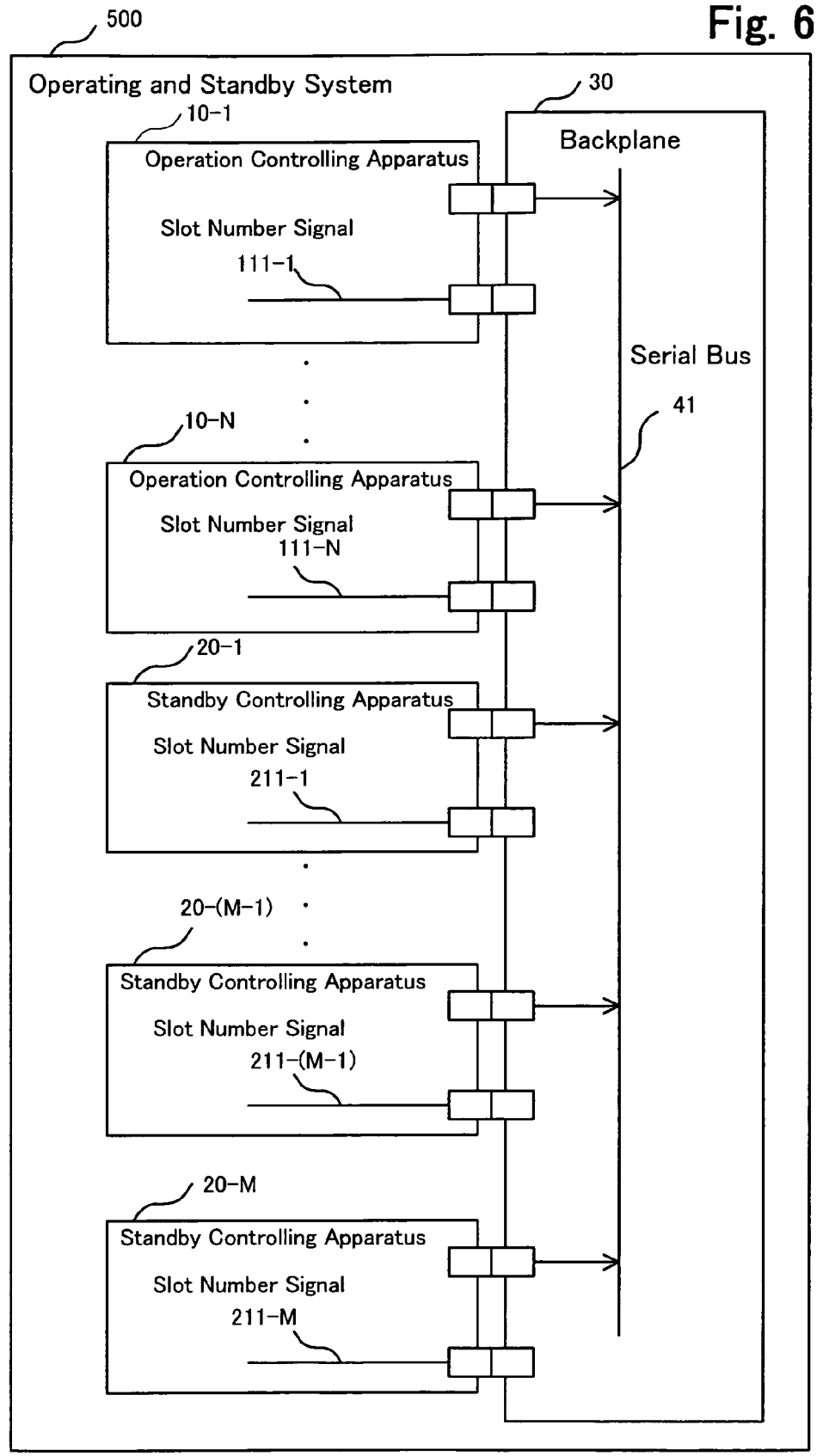
FIG. 6 is a block diagram illustrating the configuration according to a third embodiment of the present invention.

Referring to FIG. 6, the operation and standby system 500 includes operation controlling apparatuses 10-1, 10-2, . . . ,10-N and standby controlling apparatuses 20-1,20-2, . . . ,20-M. Operation controlling apparatuses 10-1, 10-2, . . . ,10-N have different slot number signals 111-1,111-2, . . . ,111-N. The standby controlling apparatuses 20-1, 20-2, . . . ,20-M also have different slot number signals 211-1,211-2, . . . ,211-M. The standby controlling apparatus 20-M that has the maximum slot number signal among the standby controlling apparatuses 20-1,20-2, . . . ,20-M usually operates as the representative standby controlling apparatus. The remaining standby controlling apparatuses 20-1, 20-2, . . . ,20-(M−1) stop operating as the non-representative standby controlling apparatuses. If an error occurs with one of the operation controlling apparatuses 10-1,10-2, . . . ,10-N, the representative standby controlling apparatus 20-M will begin to operate as the operation controlling apparatus, and the non-representative standby controlling apparatus 20-(M−1) with the second largest slot number signal 211-(M−1) will begin to operate as the standby controlling apparatus. It is possible to operate each standby controlling apparatuses 20-1,20-2, . . . ,20-M one by one in order.

It is possible in the third embodiment of the present invention to be compatible with cases where there are multiple operation controlling apparatuses and multiple standby controlling apparatuses.

While this invention has been described in conjunction with the preferred embodiments described above, it will now be possible for those skilled in the art to put this invention into practice in various other manners.

What is claimed is:

1. A first apparatus which is connected to a second apparatus through a bus, said first apparatus comprising:
    a controller which controls an operation of said first apparatus;
    an operation manager which monitors an operation of said controller; and
    a switch which disconnects said operation manager from said bus except when said operation manager notifies said second apparatus that said controller is operating normally through said bus,
    wherein said operation manager outputs a switch signal to said switch, said switch signal causing said switch to switch between a connection between said operation manager and said controller, and a connection between said operation manager and said bus.

2. The first apparatus according to claim 1, wherein said operation manager sends a first command for changing a first signal to said second apparatus through said switch in order to notify said second apparatus that said controller operates normally.

3. The first apparatus according to claim 1, further comprising:
    a monitor controller which monitors a second command for resetting said first apparatus.

4. The first apparatus according to claim 3, wherein said monitor controller comprises:
    a signal register which stores said second signal utilized for resetting said first apparatus; and
    a command receiver which receives said second command and stores said second signal in said signal register.

5. The first apparatus according to claim 1, wherein said bus is a serial bus.

6. The first apparatus according to claim 1, wherein said switch is connected to said operation manager by a first bus and is connected to said controller by a second bus, said operation manager monitoring an operation of said controller through said first and. second buses.

7. The first apparatus according to claim 1, wherein said operation manager outputs said switch signal to said switch for connecting said operation manager to said bus at a predetermined interval.

8. A second apparatus which is connected to a first apparatus through a bus, said second apparatus comprising:
    a controller which controls an operation of said second apparatus;
    an operation manager which monitors an operation of said first apparatus; and
    a switch which disconnects said operation manager from said bus except when said operation manager resets said first apparatus through said bus,
    wherein said operation manager outputs a switch signal to said switch, said switch signal causing said switch to switch between a connection between said operation manager and said controller, and a connection between said operation manager and said bus.

9. The second apparatus according to claim 8, wherein said operation manager sends a first command for resetting said first apparatus to said first apparatus through said switch when said first apparatus is not operating normally.

10. The second apparatus according to claim 8, further comprising:
    a monitor controller which monitors a second command for changing a second signal utilized for confirming that said first apparatus is operating normally.

11. The second apparatus according to claim 10, wherein said monitor controller comprises:
    a signal register which stores said second signal; and
    a command receiver which receives said second command from said first apparatus and then reverses said second signal stored in said signal register.

12. The second apparatus according to claim 8, wherein said bus is a serial bus.

13. The second apparatus according to claim 8; wherein said operation manager operates said second apparatus as new first apparatus after sending a second command for resetting said first apparatus.

14. A system comprising:
a first apparatus;
a second apparatus; and
a bus which connects said first apparatus and said second apparatus,
wherein said first apparatus comprises:
a first controller which controls an operation of said first apparatus;
a first operation manager which monitors an operation of said first controller; and
a first switch which disconnects said first operation manager from said bus except when said first operation manager notifies said second apparatus that said first controller is operating normally through said bus; and
wherein said second apparatus comprises:
a second controller which controls an operation of said second apparatus;
a second operation manager which monitors an operation of said first apparatus; and
a second switch which disconnects said second operation manager from said bus except when said second operation manager resets said first apparatus through the bus,
wherein said first operation manager outputs a switch signal to said first switch, said switch signal causing said first switch to switch between a connection between said first operation manager and said first controller, and a connection between said first operation manager and said bus.

15. The system according to claim 14, wherein said first operation manager sends a first command for changing a first signal to said second apparatus through said first switch in order to notify said second apparatus that said first controller is operating normally.

16. The system according to claim 14, wherein said second operation manager sends a second command for resetting said first apparatus to said first apparatus through said second switch when said first apparatus does not operate normally.

17. The system according to claim 14, wherein said second operation manager operates said second apparatus as new first apparatus after sending said second command.

18. The system according to claim 17, further comprising:
a main second apparatus which operates as said second apparatus; and
a sub second apparatus which is on standby for operating as said main second apparatus;
wherein said sub second apparatus operates as said main second apparatus when said main second apparatus starts to operate as new first apparatus.

19. The system according to claim 14, wherein said second apparatus comprises:
a first signal register which stores a first signal utilized for confirming that said first apparatus is operating normally; and
a first command receiver which receives a first command for changing said first signal and then reverses said first signal stored in said first signal register.

20. The system according to claim 14, wherein said first apparatus comprises:
a second signal register which stores a second signal for resetting said first apparatus; and
a second command receiver which receives a second command for resetting said first apparatus and then stores said second signal in said second signal register.

21. The system according to claim 14, wherein said bus is a serial bus.

22. A method for controlling a first apparatus which is connected to a second apparatus through a bus, comprising:
monitoring, by an operation manager, an operation of a controller which controls an operation of said first apparatus; and
disconnecting, by a switch, said operation manager from said bus except when said operation manager notifies said second apparatus that said controller is operating normally,
sending a switch signal from said operation manager to said switch, said switch signal causing said switch to switch between a connection between said operation manager and said controller, and a connection between said operation manager and said bus.

23. The method according to claim 22, further comprising:
sending a first command for changing a first signal to said second apparatus through said bus in order to notify the second apparatus that said controller operates normally.

24. The method according to claim 22, further comprising:
storing a second signal utilized for resetting said first apparatus in a signal register when a command receiver receives a second command for resetting said first apparatus from said second apparatus.

25. A method for controlling a second apparatus which is connected to a first apparatus through a bus, comprising:
monitoring, by an operation manager, an operation of said first apparatus;
sending a first command for resetting said first apparatus from said operation manager when said first apparatus is not operating normally;
disconnecting, by a switch, said operation manager from said bus except when said operation manager sends said first command,
sending a switch signal from said operation manager to said switch, said switch signal causing said switch to switch between a connection between said operation manager and said controller, and a connection between said operation manager and said bus.

26. The method according to claim 25, further comprising:
reversing a second signal stored in a signal register when a command receiver receives a second command for changing said first signal from said first apparatus.

27. The method according to claim 25, further comprising:
operating said second apparatus as new first apparatus after sending said reset command.

28. A method for controlling a system having a first apparatus, a second apparatus, and a bus which connects said first apparatus and said second apparatus, comprising:
monitoring, by an first operation manager, an operation of first controller which controls an operation of said first apparatus;
disconnecting, by a switch, said first operation manager from said bus except when said first operation manager notifies said second apparatus that said first controller is operating normally;
monitoring, by an second operation manager, an operation of said first apparatus; sending a first command for resetting said first apparatus from said second operation manager when said first apparatus is not operating normally; and
disconnecting a second operation manager from said bus except when said second operation manager sends said first command,
wherein said first operation manager outputs a switch signal to said switch, said switch signal causing said switch to switch between a connection between said first operation manager and said first controller, and a connection between said first operation manager and said bus.

29. The method according to claim 28, further comprising:
sending a second command for changing a second signal to said second apparatus in order to notify said second apparatus That said first controller operates normally.

30. The method according to claim 28, further comprising:
operating said second apparatus as new first apparatus after sending said first command.

31. The method according to claim 28, further comprising:
operating a main second apparatus as said second apparatus;
being on standby a sub second apparatus for operating as said main second apparatus; and
operating said sub second apparatus as said main second apparatus when said main second apparatus starts to operate as new first apparatus.

32. The method according to claim 28, further comprising:
storing a first signal for resetting said first apparatus in a signal register when a command receiver receives said first command from said second apparatus.

33. The method according to claim 28, further comprising:
reversing a second signal stored in a signal register when a command receiver receives a second command for changing said second signal from said first apparatus.

* * * * *